United States Patent [19]

Rice

[11] Patent Number: 5,325,661
[45] Date of Patent: Jul. 5, 1994

[54] JET MIXER NOISE SUPPRESSOR USING ACOUSTIC FEEDBACK

[75] Inventor: Edward J. Rice, Westlake, Ohio

[73] Assignee: The United States of America as represented by the Administrator of the National Aeronautics and Space Administration, Washington, D.C.

[21] Appl. No.: 46,256

[22] Filed: Apr. 14, 1993

[51] Int. Cl.$^5$ .................................................. F02C 7/00
[52] U.S. Cl. ...................................... 60/204; 60/262; 60/271; 181/213
[58] Field of Search ................. 60/262, 269, 271, 204; 181/206, 213, 217, 219, 220, 238

[56] References Cited

U.S. PATENT DOCUMENTS

| | | |
|---|---|---|
| 2,935,842 | 5/1960 | Highberg et al. . |
| 3,174,282 | 3/1965 | Harrison . |
| 3,262,645 | 7/1966 | Veno . |
| 3,666,044 | 5/1972 | Killian . |
| 3,677,501 | 7/1972 | Denning . |
| 3,893,640 | 7/1975 | Hull et al. . |
| 4,036,452 | 7/1977 | Schairer . |
| 4,168,044 | 9/1979 | Rethorst . |
| 4,215,536 | 8/1980 | Rudolph . |
| 4,217,756 | 8/1980 | Laskody . |
| 4,501,393 | 2/1985 | Klees et al. . |

Primary Examiner—Louis J. Casaregola
Attorney, Agent, or Firm—Gene E. Shook; Guy M. Miller; James A. Mackin

[57] ABSTRACT

The present invention generally relates to providing an improved jet mixer noise suppressor for high speed jets that rapidly mixes high speed air flow with a lower speed air flow, and more particularly, relates to an improved jet mixer noise suppressor that uses feedback of acoustic waves produced by the interaction of sheer flow instability waves with an obstacle downstream of the jet nozzle.

6 Claims, 7 Drawing Sheets

FULLY EXPANDED MACH NUMBER

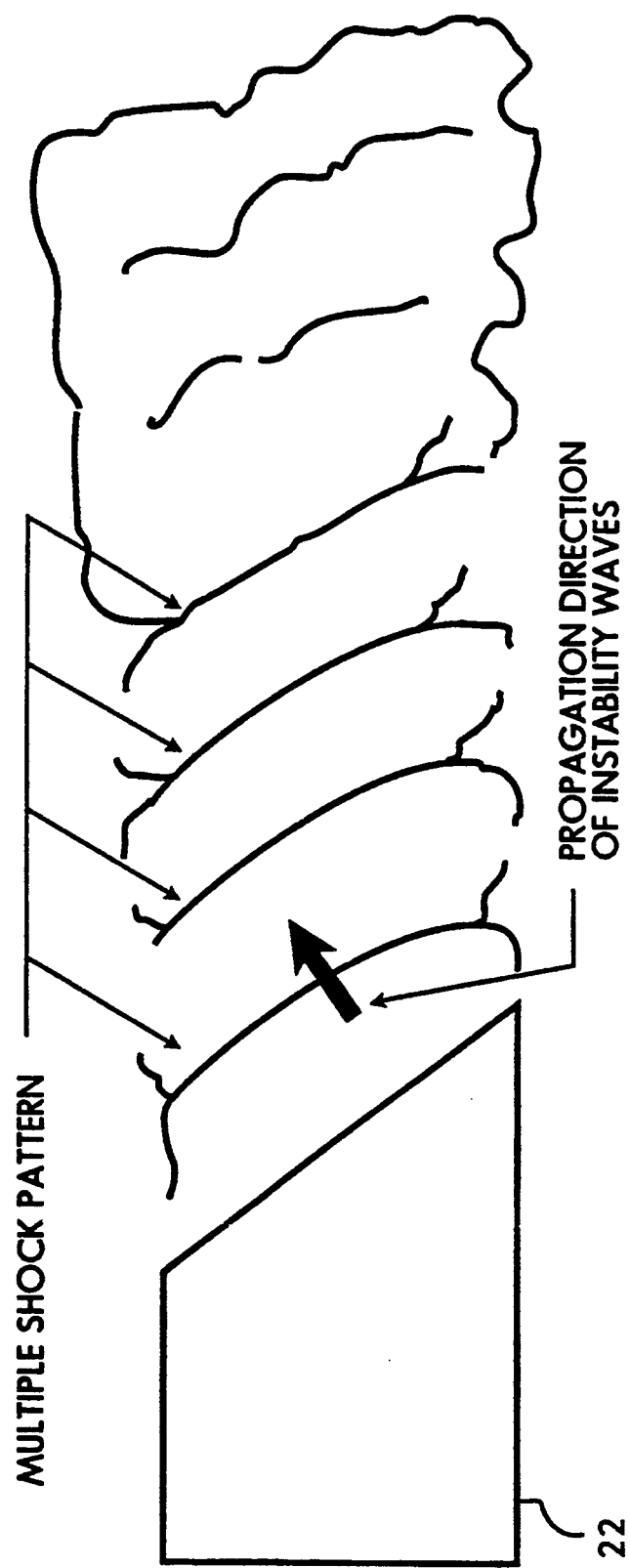

JET MIXER NOISE SUPPRESSOR USING ACOUSTIC FEEDBACK

ORIGIN OF THE INVENTION

The invention described herein was made by an employee of the U.S. Government and may be manufactured and used by or for the Government for governmental purposes, without the payment of any royalties thereon or therefor.

TECHNICAL FIELD

The present invention generally relates to providing an improved jet mixer noise suppressor for high speed jets that rapidly mixes high speed air flow with a lower speed air flow, and more particularly, relates to an improved jet mixer noise suppressor that uses feedback of acoustic waves produced by the interaction of sheer flow instability waves to enhance the mixing of the higher and lower speed air flow, suppressing noise exiting from the jet nozzle.

BACKGROUND ART

Presently, there does not exist any jet mixer which is designed to specifically utilize acoustic feedback from downstream of a jet nozzle to enhance the mixing of jet air exiting from a jet nozzle. Rather, a variety of mixers/suppressors have been developed to provide enhanced mixing of two different jet or velocity streams. These improved mixers, for example, have reduced the dimension of the high speed flow passage of the ejector resulting in mechanical and performance limitations. Accordingly, the conventional turbulent mixing process has been used to perform the mixing using the smaller high speed flow passage.

Other jet mixer noise suppressors which have been used to provide mixing of two different velocity streams have been constructed of multiple lobed, radially aligned, alternate passages of higher and lower velocity streams for annular or ring-like geometries. Additional mixer noise suppressors have been constructed using parallel alternate passages for rectangular nozzle geometries. Further, mixer noise suppressors have been constructed using single vortex generators which mix fan air with primary exhaust flow across the engine exhaust area. However, these prior art mixer noise suppressors have involved less than optimum flow mixing rates and poor noise reduction due to noise radiation. In addition, the prior art mixer noise suppressors have been complex, bulky and of considerable length resulting in a mixer which is heavier and more expensive to incorporate into a jet engine.

The jet mixer noise suppressor of the present invention is more suitable than the prior art jet mixer noise suppressors since, by using the feedback of acoustic waves received from the down stream side of the nozzle, the jet mixer noise suppressor of the present invention is able to provide excellent mixing of jet streams while being relatively short in length, lighter in weight and less expensive than the prior art jet mixers. In addition, many applications requiring jet mixer noise suppressors require lower noise output from the device than the prior art mixer noise suppressors can provide. Accordingly, the present invention can be used in these types of applications since the present invention is able to provide greatly enhanced mixing of jet flow streams, thus greatly reducing the noise output from the jet engine.

SUMMARY OF THE INVENTION

It is, therefore, an object of the present invention to provide an improved mixer which is smaller in size, lighter in weight and lower in cost.

It is another object of the present invention to provide an improved mixer which will provide thorough mixing in significantly shorter distances and which will render the mixing produced noise more amenable to reduction using acoustic treatment.

It is an additional object of the present invention to provide an improved jet mixer noise suppressor which utilizes acoustic feedback resulting from sound waves produced by the interaction of sheer flow instability waves with multiple structured obstacles down stream of the nozzle.

The jet mixer noise suppressor of the present invention uses multiple jet nozzles, surrounded by entrained ambient air to flap in unison using the acoustic waves fed back from downstream of the nozzles to rapidly enhance the mixing of the jets. The jet mixer noise suppressor of the present invention uses the natural interaction of shear layer coherent structure with shock cells found in an imperfectly expanded supersonic jet which generates screech. The screech causes feedback of the acoustic waves to the nozzle lip creating resonance and creating instability waves. The present invention uses a nozzle which outputs high velocity air flow that is in phase with airflow exiting from an adjacent nozzle to cause the jet air flow to flap in unison and mixes these jet air flows with the instability waves to enhance the mixing of the jet flow.

In an alternative embodiment, the jet mixer noise suppressor of the present invention uses small paddles or obstacles in the path of the jet flow near the shear layer edge. The jet coherent structure interacts with these obstacles causing feedback of the acoustic waves to the nozzle lip which excites the coherent structure, thereby closing the feedback loop.

In carrying out the above objects of the present invention, there is provided a jet mixer noise suppressor which includes a first nozzle outputting a first air stream generating feedback of a first acoustic wave from downstream of the first nozzle and a second nozzle outputting a second air stream, synchronous with the first air stream, generating feedback of a second acoustic wave from downstream of the second nozzle. In addition, the jet mixer noise suppressor includes an ejector having an inlet, outlet and shroud, receiving the first and second air streams from the first and second nozzles through the inlet, receiving entrained air produced from the first and second air streams being received by the ejector, receiving the first and second acoustic waves fed back from downstream of the first and second nozzles through the outlet, and mixing the first and second air steams and the entrained air responsive to the first and second acoustic waves in the shroud. Further, the first and second nozzles of the present invention are positioned so that the first and second acoustic waves are out of phase with each other.

These objects, together with other objects and advantages which will be subsequently apparent, reside in the details of construction and operation, as more fully hereinafter described and claimed, reference being had to the accompanying drawings forming a part hereof, wherein like reference numerals refer to like parts throughout.

BRIEF DESCRIPTION OF THE DRAWINGS

FIG. 5 is a diagram of the second embodiment of the present invention illustrating a beveled nozzle used to provide an external repetitive shock structure to create the desired acoustic feedback;

DESCRIPTION OF THE PREFERRED EMBODIMENTS

Figure 1:
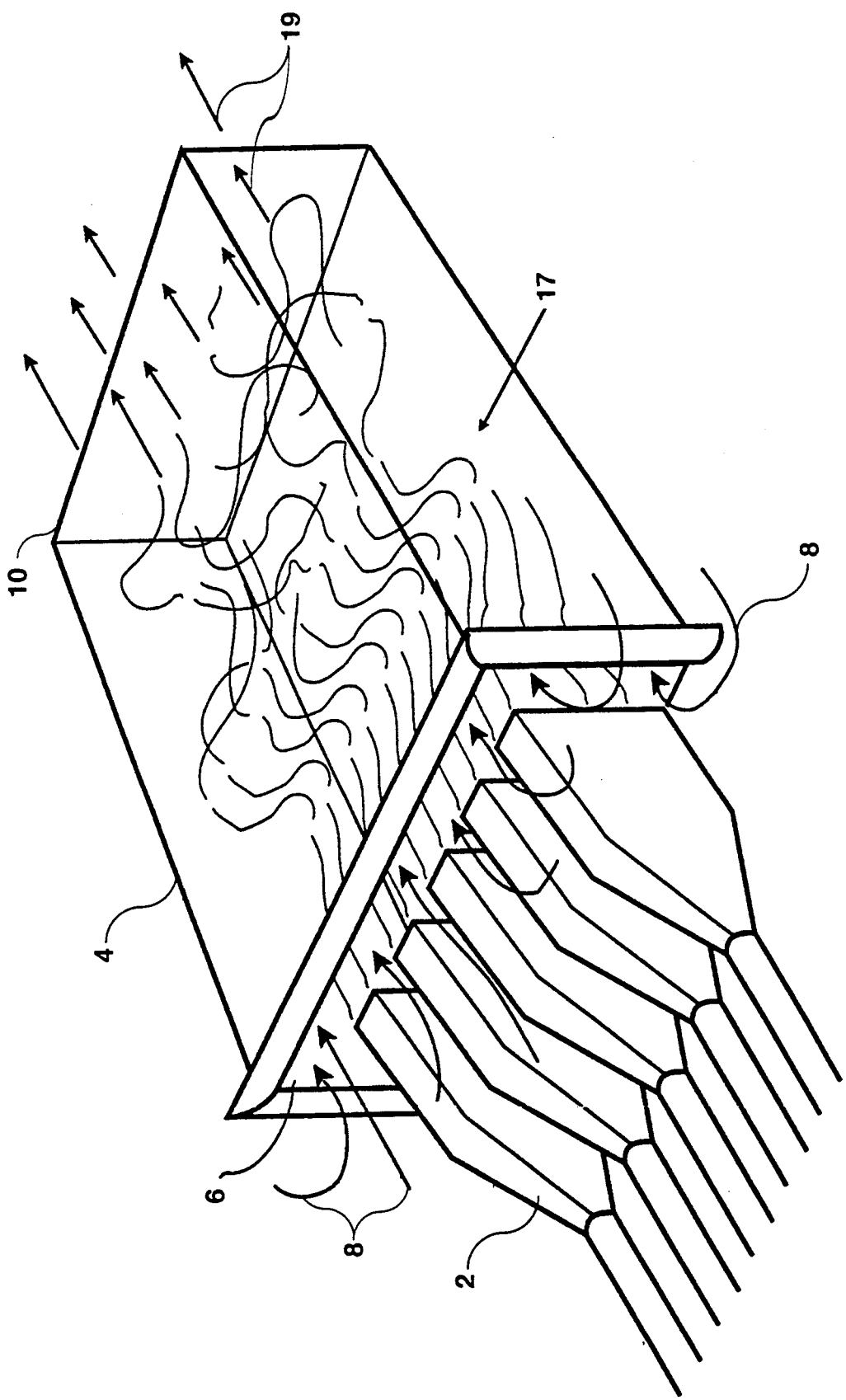
FIG. 1 is a basic structural diagram of the first embodiment of the present invention.
Figure 2:
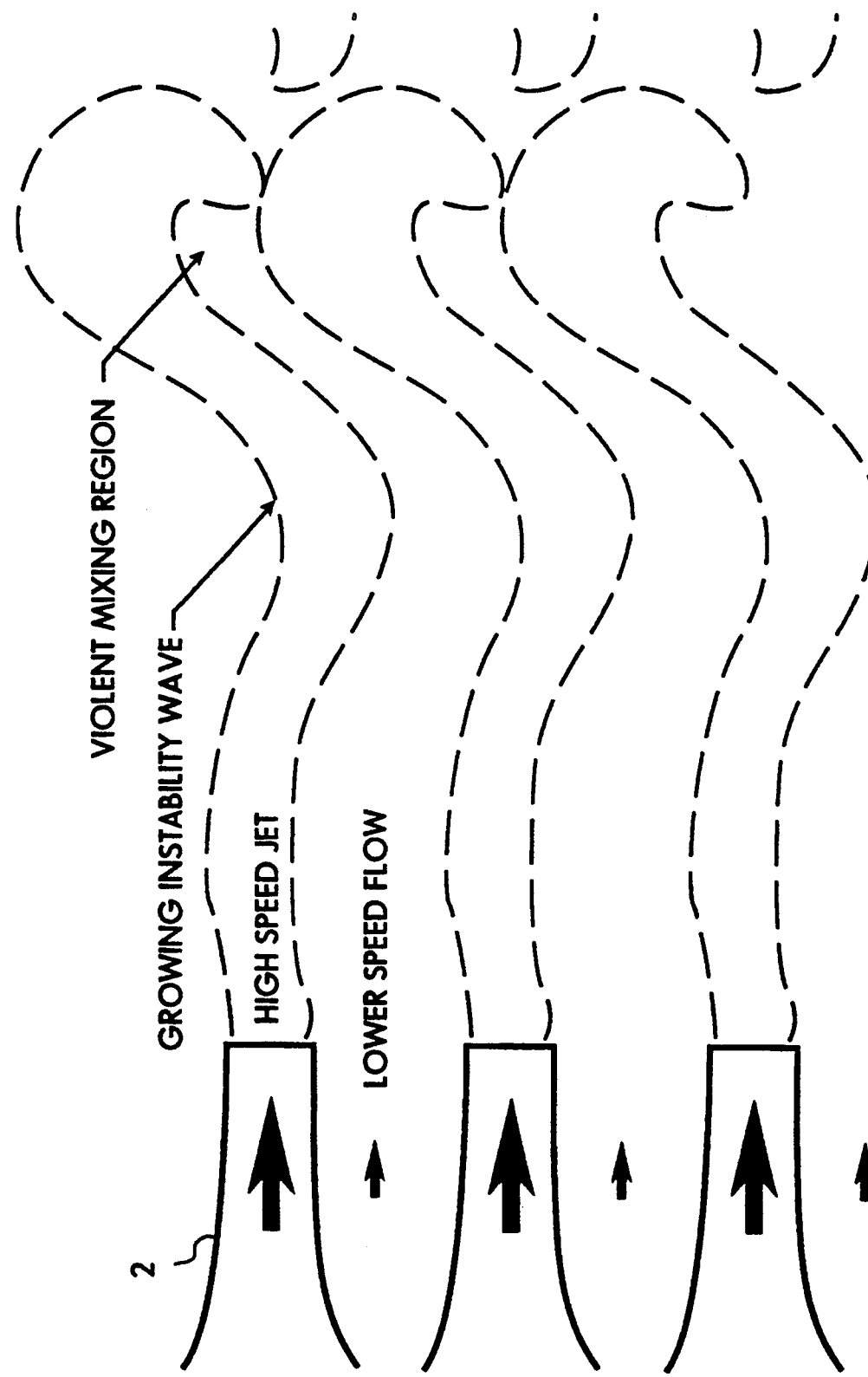
FIG. 2 is a top view of multiple jets emitting high speed jet flows of FIG. 1.

Referring to FIG. 1, a basic structural description of the first embodiment of the present invention is shown. In FIG. 1, multiple primary high velocity nozzle jets 2 used in an imperfectly expanded supersonic jet are shown which emit high velocity jet flow into ejector shroud 4 through ejector inlet 6. In addition, lower velocity air 8 is entrained into ejector shroud 4 through ejector inlet 6 due to high velocity jet flow drawing lower velocity air 8 into ejector shroud 4. The higher and lower velocity air streams are then mixed using acoustic waves fed back from downstream of nozzles 2 resulting from highly directional sound waves produced by the interaction of sheer flow instability waves with obstacles down stream of nozzles 2. In FIG. 1, multiple nozzle jets 2 are separated by a predetermined distance and emit high velocity jets which are in phase in order to obtain synchronous multiple mixing processes and resonant motion 19 of the air flow by mixing the higher and lower velocity air flow. After all the mixing processes have occurred a fully mixed exhaust 19, which consist of lower velocity but higher mass flow than primary air, exits through the ejector outlet 10. Nozzles 2 may alternatively be positioned in an annular configuration as well. FIG. 2 shows in more detail multiple nozzles 2 emitting high velocity jets which are in phase with each other as indicated with respect to FIG. 1 to obtain the enhanced mixing. The enhanced mixing moves the mixing process back toward the nozzles exits and this moves the source of downstream propagating acoustics waves back up toward the nozzle exits. As a result of the longer propagation length the acoustic treatment of the shroud walls can be more effective.

Figure 3:
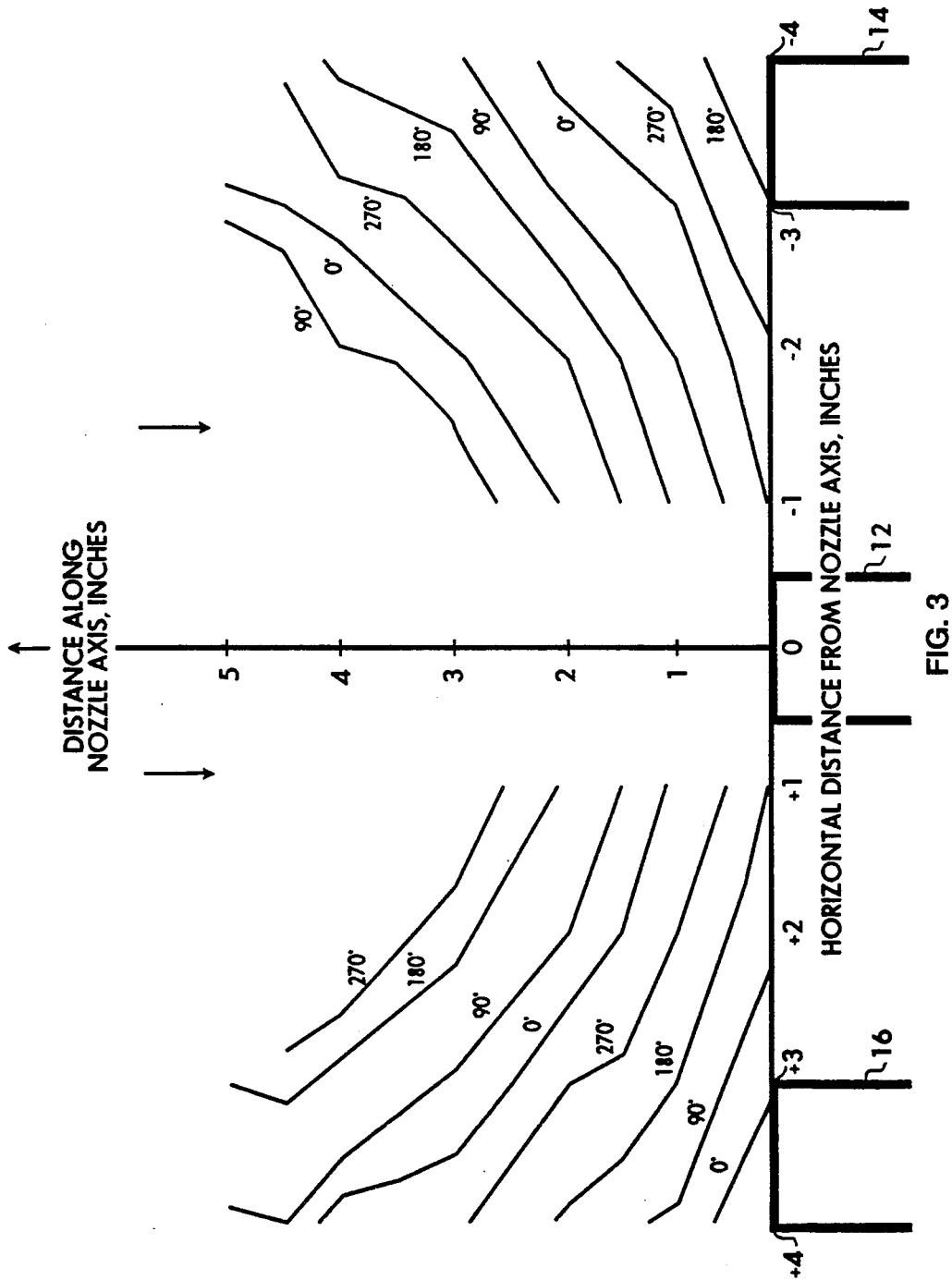
FIG. 3 is a diagram of the phase plot of the acoustic field resulting from the interaction of the flow coherent structure with the downstream shock structure.

FIG. 3 shows an exemplary screech phase plot for an imperfectly expanded supersonic jet using a conventional converging nozzle run at a high pressure resulting in acoustic feedback or screech from the downstream of the converging nozzle. As shown in FIG. 3, the shock pattern which returns from downstream of nozzle 12 has several contours of constant phase with respect to pressure in comparison to a reference point. As is also shown in FIG. 3, the shock pattern returning from the downstream side of nozzle 12 to the left of nozzle 12 has contours of constant phase which are 180° out of phase with the contours on the right side of nozzle 12. This screech phase plot was generated at one mach speed, and additional phase plots can be generated at other desired mach speeds to operate the supersonic jet.

In order to generate the flapping wave motion of the jet, i.e., the instability waves for enhanced mixing of the higher and lower velocity air flows, the acoustic waves between the nozzles should be out of phase with each other. Thus, the acoustic waves returning from the downstream of the right side or edge of nozzle 12 in FIG. 3 should be out of phase with the acoustic waves returning from the down stream side of the left side of nozzle 14. Similarly, the acoustic waves generated from the down stream of the left side of nozzle 12 should be out of phase with the acoustic waves returning from the down stream of the right edge of nozzle 16. Thus, the phase differences between the acoustic waves will generate instability waves which will enhance the mixing between the higher and lower velocity air flows. Based upon the phase plot of FIG. 3, it can readily be seen for the specific mach speed which this data was observed, that the left side of nozzle 14 should be placed approximately 3" to the right of the center of nozzle 12 since the right side of nozzle 12 is at the 0° phase contour and the left side of nozzle 14 is at the 180° phase contour on the curve X=0, X being the vertical distance from the nozzle axis of nozzle 12. Thus, nozzles 12 and 14, if placed as indicated above, will be out of phase with each other thereby generating the instability waves which provide resonant mixing of the higher and lower velocity airflow.

Figure 4A:
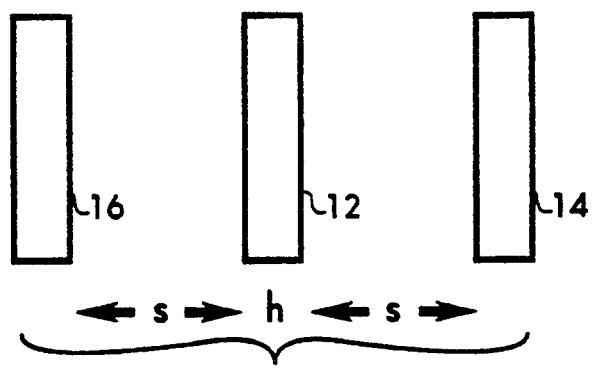
FIGS. 4(a) and 4(b) are diagrams illustrating the mixer element spacing to obtain enhanced mixing using resonant mixing of jet flows.
Figure 4B:
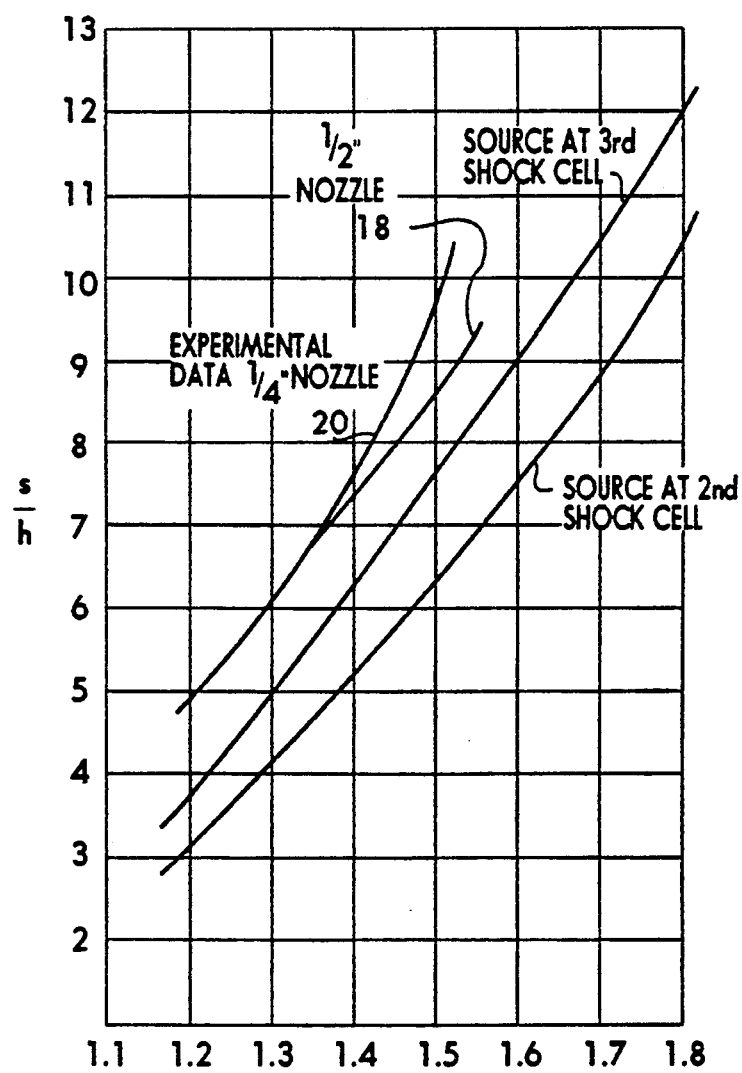

FIGS. 4(a) and 4(b) are graphs showing observed actual data which may be used to determine the spacing between nozzles to obtain the instability waves with reference to different mach numbers for a specific jet engine. FIG. 4(a) shows that the nozzles are separated by a distance s for a given nozzle width h. In FIG. 4(b), at mach speed 1.5, for a ½" nozzle, curve 18 shows that the ratio of distance between the nozzles (s) over nozzle width (h) is approximately 8.75. If the same nozzle was to be used at, for example, mach 1.3, the ratio between the distance between the nozzles over the nozzle width would be approximately 6.3. FIG. 4 also shows data recorded for a ¼" nozzle along curve 20. Thus, FIG. 4(b) shows observed data for two different sized nozzles at various mach speeds. To further verify that the observed data was correct, theoretical data was also plotted on FIG. 4(b) for when the source of the shock emanated from the third shock cell as well as from the second shock cell of the shock pattern of the instability waves. From FIG. 4(b) it appears that the source of the shock wave emanates from approximately the fourth shock cell according to the observed data for that particular jet nozzle. Thus, FIG. 4(b) can be used to determine the appropriate spacing between nozzles based upon the mach speed which the jet nozzle is to operate.

FIG. 5 shows a second embodiment of the present invention which involves a beveled nozzle 22 generating a multiple shock pattern which is approximately parallel to beveled nozzle lip 24. Thus, beveled nozzle 22 redirects the mixing generated noise of the acoustic wave toward an enclosing wall to control the form of the acoustic wave and thereby achieve enhanced noise reduction. The beveled nozzle preferably includes internal contours which provide external repetitive shock structure which is nearly parallel to the lip of beveled nozzle 22 in order to redirect the acoustic wave from downstream of nozzle 22. In this second embodiment, since nozzle 22 is expected to generate instability waves, it is preferable that a converging nozzle operated at a high pressure be used in conjunction with beveled lip 24 of nozzle 22. Thus, the second embodiment of the present invention modifies the nozzle opening shape to cause the natural instabilities of the shear flow between the nozzle jets and the surrounding air to propagate at an angle oblique to the jet axis which would be larger than that occurring in the prior art jet nozzles. This propagation of the natural instabilities at an oblique angle further contributes to the enhanced mixing of the higher and lower velocity air flows, further decreasing the exiting noise. The proper spacing between the beveled nozzles to provide enhanced mixing can be determined by collecting data as described in the first embodiment of the present invention with respect to FIGS. 3 and 4.

In addition to the single beveled nozzle 22, a double beveled nozzle could also be used which would have a converging lip forming a pyramid shape and generate external repetitive shock structures which are nearly parallel to each beveled portion of the nozzle lip in order to redirect the acoustic wave from downstream of the nozzle.

Figure 6:
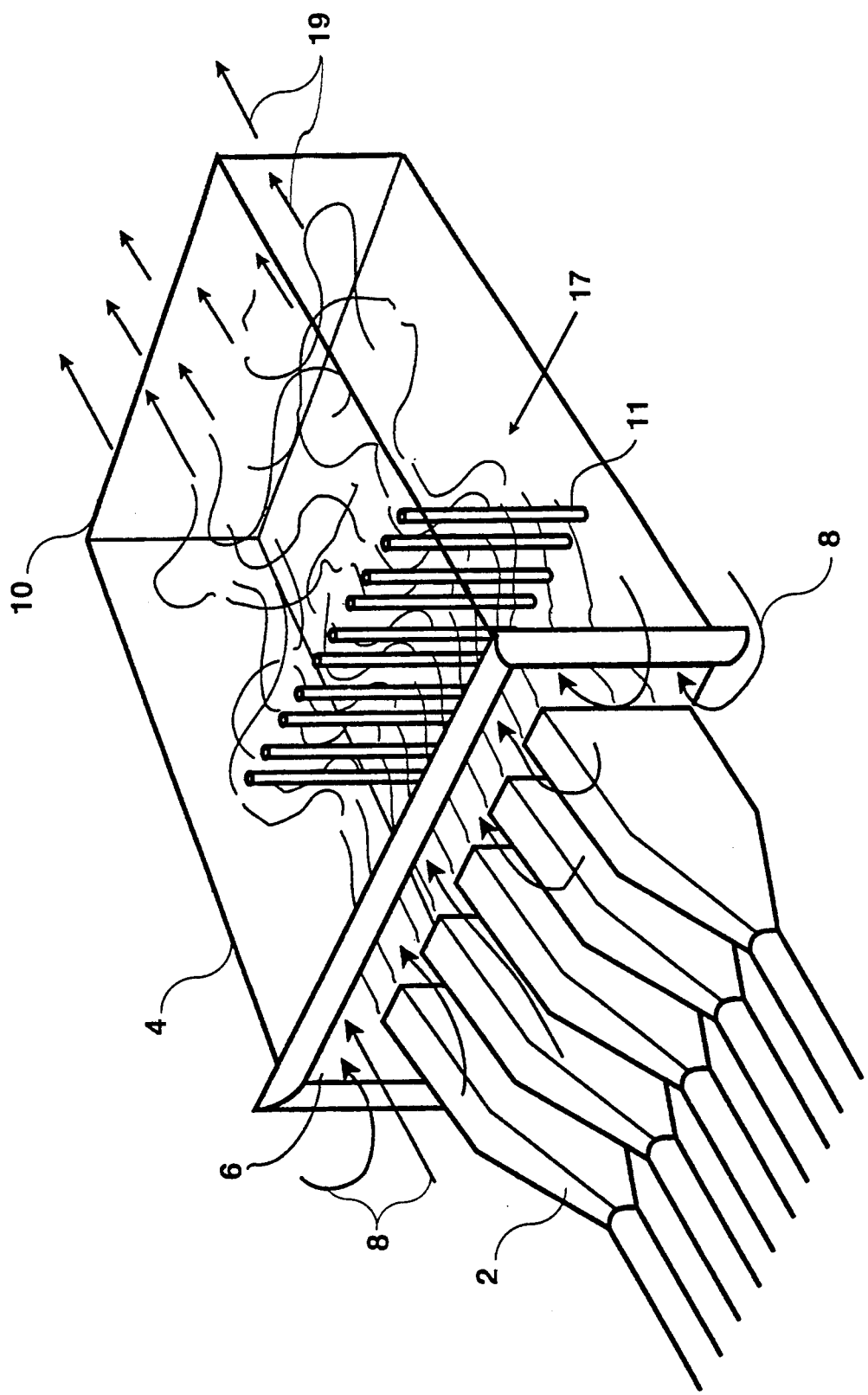
FIG. 6 is a diagram of the general structure of the third embodiment of the present invention which uses obstacles in the path of the jet flow to enhance mixing of resonant jet flow.

FIG. 6 shows a third embodiment of the present invention which can also be used to redirect the instability waves and provide proper phasing of the acoustic waves to produce enhanced mixing of the higher and lower velocity air flows. It is preferable, as shown in FIG. 6, that paddles 11 are grouped in pairs and placed in the path of the higher velocity air flow exiting from the nozzles for each nozzle 2. Paddles 11 are also preferably connected to the top and bottom of ejector shroud 4. The jet coherent structure interacts with paddles 11 causing an acoustic feedback to the nozzle lip which excites the coherent structure and closes the feedback loop. Additionally, oblique propagation angle of the instability waves could also be accomplished by mounting paddles 11 at an angle with respect to the jet axis. The proper spacing between nozzle to provide enhanced mixing can be determined by collecting data as described in the first embodiment of the present invention with respect to FIGS. 3 and 4.

Figure 7:
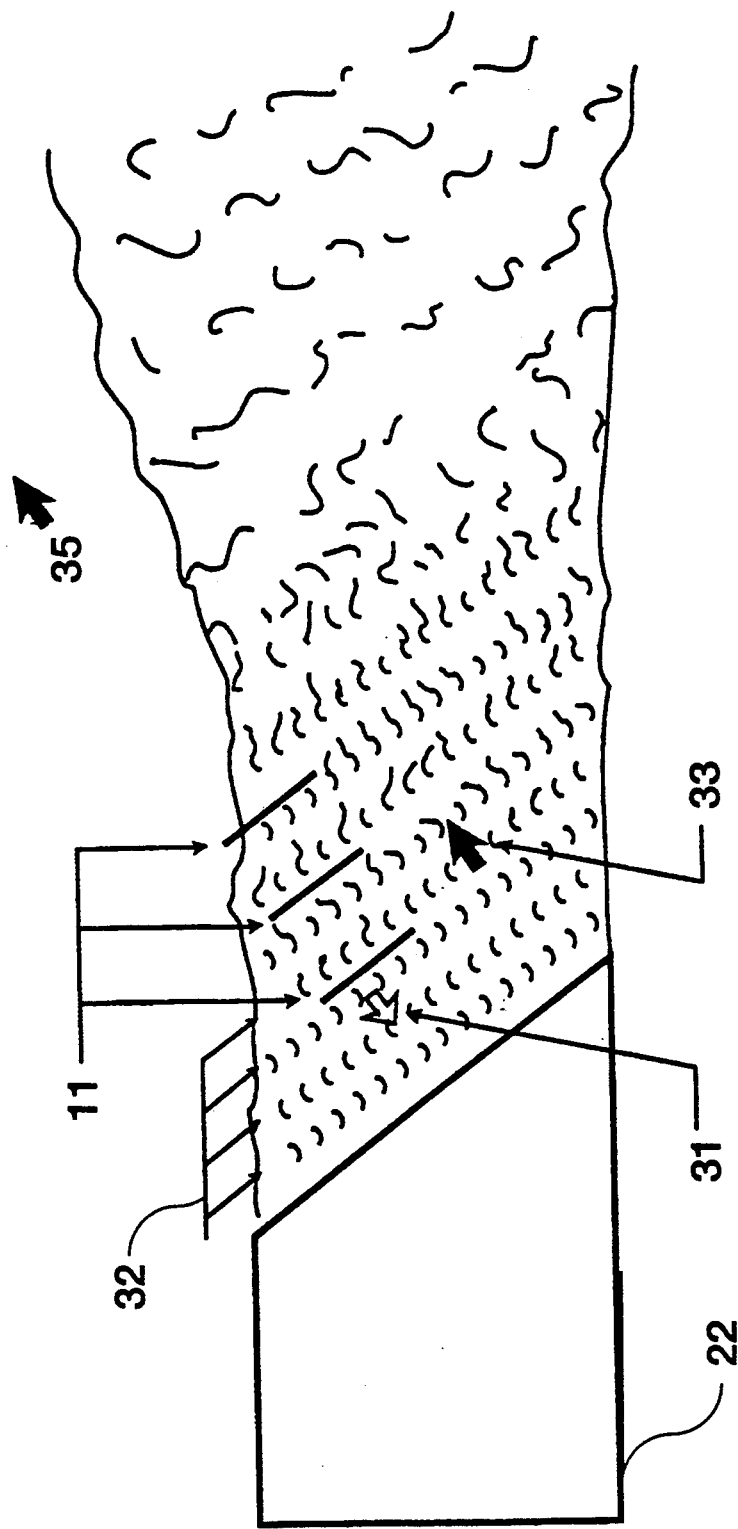
FIG. 7 is a diagram of the fourth embodiment of the present invention which illustrates a beveled nozzle of the second embodiment of the present invention used together with multiple obstacles of the third embodiment of the present invention to obtain enhanced mixing of the jet flow.

Finally, FIG. 7 shows a fourth embodiment of the present invention which includes a beveled nozzle of the second embodiment with paddles 11 of the third embodiment where paddles 11 are preferably parallel to the beveled lip of the nozzle thereby causing acoustic feedback 3. The use of obstacles in the third and fourth embodiments of the present invention is especially important when the nozzles do not emit a substantial amount of shock waves such as a properly expanded shock free nozzle. In addition, the use of the obstacles causes the sheer flow instability waves 32 to have a propagation direction 53 which is oblique to the jet axis so that the downstream acoustic waves 35 generated by the mixing process is more amenable to the use of acoustic treatment which thereby enhances the reduction of noise produced by the mixing of the higher and lower velocity air flows.

The many features and advantages of the invention are apparent from the detailed specification and, thus, it is intended by the appended claims to cover all such features and advantages of the invention which fall within the true spirit and scope of the invention. Further, since numerous modifications and changes will occur to those skilled in the art, it is not desired to limit the invention to the exact construction and operation illustrated and described, and, accordingly, all suitable modifications and equivalents may be resorted to falling within the scope of the invention.

What is claimed:

1. A jet mixer noise suppressor, comprising:
   a first nozzle outputting a first air stream along a first path generating feedback of a first acoustic wave from downstream of said first nozzle;
   a second nozzle outputting a second air stream along a second path, synchronous with said first air stream, and generating feedback of a second acoustic wave from downstream of said second nozzle;
   an ejector having an inlet, outlet and shroud, said ejector receiving said first and second air streams from said first and second nozzles through said inlet, receiving entrained air produced from said first and second air streams through said inlet, receiving said first and second acoustic waves fed back from downstream of said first and second nozzles through said outlet, and mixing said first and second air streams and said entrained air responsive to said first and second acoustic waves in said shroud; and
   first and second obstacles, disposed in said shroud of said ejector and positioned in said first and second paths to be in contact with said first and second air streams so that said first and second acoustic waves are out of phase with each other.

2. A jet mixer noise suppressor as set forth in claim 1, wherein said first and second obstacles each comprise a pair of paddles.

3. A jet mixer noise suppressor as set forth in claim 1,
   wherein the mixing performed by said ejector generates instability waves which mix said first and second air streams and said entrained air,
   wherein said first nozzle includes a bevelled outlet lip propagating, said instability waves substantially parallel to said bevelled outlet lip, and
   wherein said first and second obstacles are positioned in said shroud to be substantially parallel to said bevelled outlet lip.

4. A method of suppressing noise using a jet mixer noise suppressor, comprising the steps of:
   (a) outputting a first air stream along a first path having a first obstacle using a first nozzle, generating feedback of a first acoustic wave from downstream of the first nozzle thereby producing a first mixing process;
   (b) outputting a second air stream along a second path having a second obstacle using a second nozzle, synchronous with the first air stream, and generating feedback of a second acoustic wave from downstream of the second nozzle thereby producing a second mixing process;
   (c) receiving the first and second air streams from the first and second nozzles through an ejector inlet;
   (d) receiving entrained air produced from the first and second air streams through the ejector inlet;
   (e) propagating downstream acoustic waves from the first and second mixing processes downstream of the first and second nozzles through an ejector outlet; and (f) mixing the first and second air streams and the entrained air responsive to the first and second acoustic waves in an ejector shroud, wherein the first and second obstacles are positioned so that the first and second acoustic waves are out of phase with each other.

5. A method as set forth in claim 4, wherein the first and second obstacles each comprise a pair of paddles.

6. A jet mixer noise suppressor as set forth in claim 4, wherein said mixing step (f) generates instability waves which mix the first and second air streams and the entrained air, and wherein the first and second nozzles include a bevelled outlet lip propagating the instability wave pattern substantially parallel to the bevelled outlet lip, and wherein the first and second obstacles are positioned to be substantially parallel to the bevelled outlet lip.

* * * * *